United States Patent [19]
Pariani

[11] Patent Number: 4,778,340
[45] Date of Patent: Oct. 18, 1988

[54] MAIN HELICOPTER ROTOR

[75] Inventor: Emilio Pariani, Cardano Al Campo, Italy

[73] Assignee: Costruzioni Aeronautiche Giovanni Augusta S.p.A., Cascina, Italy

[21] Appl. No.: 930,705

[22] Filed: Nov. 13, 1986

[30] Foreign Application Priority Data

Nov. 25, 1985 [IT] Italy .................. 67987 A/85

[51] Int. Cl.$^4$ ........................................ B64C 27/74
[52] U.S. Cl. ................... 416/114; 416/61; 416/138
[58] Field of Search ............ 416/114, 102, 138 A, 416/141, 140 A, 170 B, 174 C, 244 D, 245 C, 134 A, 61

[56] References Cited

U.S. PATENT DOCUMENTS

| | | | |
|---|---|---|---|
| 2,845,132 | 7/1958 | Heckman | 416/114 X |
| 2,919,753 | 1/1960 | Hook | 416/114 X |
| 3,080,002 | 3/1963 | DuPont | 416/114 X |
| 3,545,880 | 12/1970 | Mouille | 416/114 |
| 3,637,322 | 1/1972 | Kannamuller et al. | 416/102 X |
| 3,679,322 | 7/1972 | Mouille | 416/114 X |
| 3,756,743 | 9/1973 | Robertson | 416/114 X |
| 4,302,154 | 11/1981 | Mack | 416/114 |
| 4,375,940 | 3/1983 | Lovera et al. | 416/114 |
| 4,650,400 | 3/1987 | David | 416/114 |

FOREIGN PATENT DOCUMENTS

| | | | |
|---|---|---|---|
| 702159 | 1/1941 | Fed. Rep. of Germany | 416/114 |
| 608459 | 9/1948 | United Kingdom | 416/102 |

Primary Examiner—Everett A. Powell, Jr.
Attorney, Agent, or Firm—Kane, Dalsimer, Sullivan, Kurucz, Levy, Eisele and Richard

[57] ABSTRACT

A main helicopter rotor on which a rotary tubular shaft supports, at its top end, an annular hub integral with the tubular shaft itself. The assembly consisting of the tubular shaft and the hub is closed off at the top by a bell connected in removable manner to the hub and enclosing an oscillating plate assembly supported on a fixed shaft extending inside the aforementioned tubular shaft. A rotary ring on the oscillating plate assembly is connected to blade pitch change levers via respective rocker arms connected in articulated manner to the aforementioned rotary ring via respective pins extending radially in relation to the aforementioned bell and accessible via respective radial holes formed through the same.

5 Claims, 2 Drawing Sheets

4,778,340

MAIN HELICOPTER ROTOR

BACKGROUND OF THE INVENTION

The present invention relates to a main helicopter rotor. In particular, the present invention relates to an articulated rotor of the type comprising a rotary tubular drive shaft; a hub connected to the top end of the said tubular shaft; a number of blades extending radially outwards from the said hub and each having a pitch change lever; a fixed shaft coaxial with the said rotary shaft and extending at least partially inside the same; an oscillating plate assembly supported on the said fixed shaft; a number of pitch change control rods extending inside the said rotary tubular shaft and connected to the said oscillating plate assembly; a top bell connected to the said hub, for protecting the said oscillating plate assembly; and rocker arms extending through the said bell and each connecting a respective pitch change lever to the said oscillating plate assembly.

On known rotors of the aforementioned type, the tubular shaft usually presents a top flange contacting the bottom surface of the hub, while the top bell presents a bottom flange contacting the top surface of the hub. The said two flanges are connected to each other, through the hub, by means of through pins which, for withstanding local bending stress caused by interacting forces between the tubular shaft and the hub, are driven inside respective through holes formed through the hub itself.

Such a mode of connecting the bell, hub and tubular shaft makes any assembly, dismantling, inspection and/or maintenance work on the oscillating plate assembly extremely difficult, in that access to the said assembly is only possible by dismantling the bell, which is further complicated by having to remove the pins driven through the hub, and the hub off the said tubular shaft.

In other words, therefore, on known rotors of the aforementioned type, any work on the oscillating plate entails dismantling the entire rotor.

SUMMARY OF THE INVENTION

The aim of the present invention is to provide a rotor of the aforementioned type designed to overcome the aforementioned drawback, i.e. a rotor having a structure enabling any work on the oscillating plate assembly to be carried out easily, quickly and cheaply.

With this aim in view, according to the present invention, there is provided a main helicopter rotor comprising a rotary tubular drive shaft; a hub connected to the top end of the said tubular shaft; a number of blades extending radially outwards from the said hub and each having a pitch change lever; a fixed shaft coaxial with the said rotary shaft and extending at least partially inside the same; an oscillating plate assembly supported on the said fixed shaft; a number of pitch change control rods connected to the said oscillating plate assembly; a top bell, connected to the said hub, for protecting the said oscillating plate assembly; and rocking arms extending through the said bell and each connecting a respective said pitch change lever to the said oscillating plate assembly; characterised by the fact that the said hub is integral with the said tubular shaft; the said bell being connected solely to the said hub via removable connecting means, and each said rocker arm being connected to the said oscillating plate assembly via articulated connecting means comprising a pin extending radially in relation to the said bell; the said bell presenting lateral access holes, each aligned with a respective said pin.

BRIEF DESCRIPTION OF THE DRAWINGS

A non-limiting embodiment of the present invention will be described with reference to the accompanying drawings in which.

DETAILED DESCRIPTION OF THE INVENTION

Figure 1:
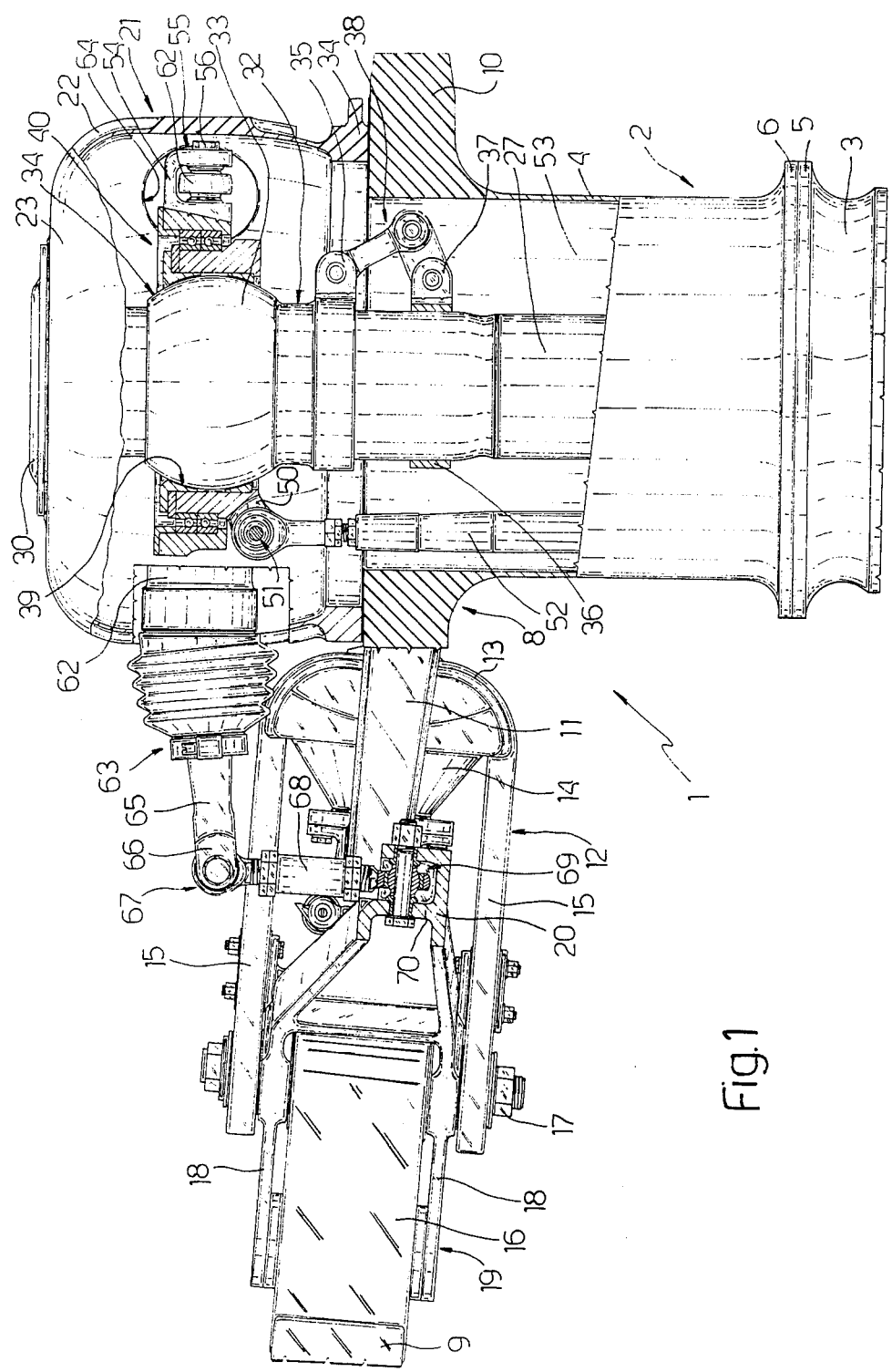
FIG. 1 shows a partially-sectioned side view, with parts removed for simplicity, of a main helicopter rotor according to the teachings of the present invention.

Number 1 in FIG. 1 indicates a main rotor on a helicopter (not shown). Rotor 1 comprises a tubular main shaft 2 extending substantially vertically and connected angularly, at the bottom end, to the output of a reduction gear casing (not shown), in turn, connected to the output of a drive unit (not shown) on the said helicopter.

Shaft 2 comprises a bottom portion 3 and a top portion 4 arranged coaxially and the facing ends of which are provided with respective annular flanges 5 and 6 connected together by means of through bolts 7.

The top end of shaft 2 presents an outwardly-flared portion constituting a hub 8 for connecting to shaft 2 a number of blades 9 extending radially outwards from hub 8. Hub 8 comprises an inner annular portion 10 integral with the top end of top portion 4 of shaft 2, and a number of lobes 11 extending radially outwards from inner portion 10 and lying in a plane substantially perpendicular to the axis of shaft 2.

Each of lobes 11 is fitted through, in known manner, with a U-shaped bracket 12 having its concave side facing radially outwards in relation to shaft 2, in such a manner as to engage, via curved centre portion 13, a curved outer portion of respective lobe 11 with which it cooperates via the interposition of an elastomeric bearing 14.

Each bracket 12 comprises two arms 15 extending parallel with each other from the opposite ends of curved centre portion 13, and gripping head 16 of a respective blade 9 to which they are secured by means of through bolts 17. Bolts 17 also secure, onto head 16 of respective blade 9, opposite arms 18 of a further U-shaped bracket 19 surrounding the inner portion of head 16 and connected integral with a pitch change lever 20 extending transversely outwards from respective bracket 19, substantially in the plane of hub 8 and substantially perpendicular to the plane of respective bracket 12.

Figure 2:
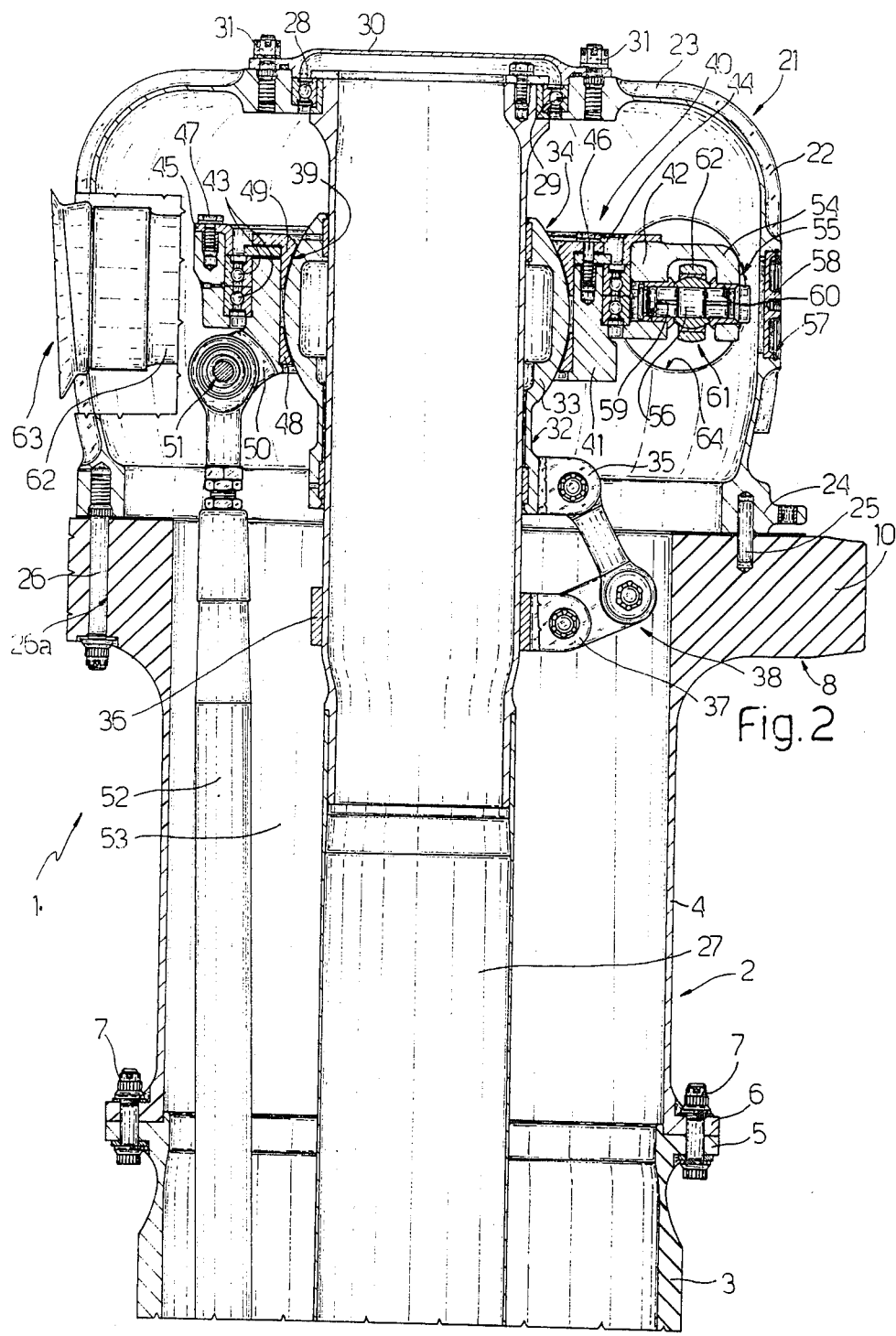
FIG. 2 shows a larger-scale axial section of a centre portion of the rotor as shown in FIG. 1.

As shown, particularly in FIG. 2, hub 8 supports a substantially cup-shaped top bell or dome 21 comprising a convex side wall 22 closed off at the top by end wall 23 and presenting, at the bottom, a flange 24 centred onto inner annular portion 10 of hub 8 by means of pins 25, coaxial with shaft 2, and secured to the said annular portion 10 by means of through bolts 26 engaging in sliding manner respective through holes 26a formed through hub 8.

As shown in FIG. 2, shaft 2 is fitted inside with a substantially cylindrical tubular shaft 27 the bottom end (not shown) of which is connected integral with the casing (not shown) of the said drive unit on the helicopter, and the top end of which extends inside bell 21 and engages, via the interposition of a bearing 28, a hole 29 formed centrally through end wall 23 and closed off by a cover 30 connected to the outer surface of wall 23 by means of screws 31.

On the portion of shaft 27 extending inside bell 21, there is mounted, in rotary and axially-sliding manner, a cylindrical sleeve 32 the top portion of which consists of a bulge or head 33 defined externally by surface 34 in the form of a spherical crown, and the bottom portion of which presents an outer radial ear 35.

Underneath sleeve 32, shaft 27 is connected integral with a further cylindrical sleeve 36 having an outer radial ear 37 connected to ear 35 by means of a link 38 designed to enable sleeve 32 to move axially along shaft 27, but not to rotate about the axis of the same.

Surface 34 engages a spherical centre seat 39 on an "oscillating plate" assembly 40 supported on shaft 27 inside bell 21.

As shown, particularly in FIG. 2, assembly 40 comprises an inner ring 41, hereinafter referred to as a "fixed ring", locked angularly in known manner (not shown) onto head 33 in such a manner as to oscillate in any direction, in relation to head 33, about the centre of surface 34, but not to turn about the axis of shaft 27. On fixed ring 41, there is mounted, in rotary manner, an outer ring 42, hereinafter referred to as a "rotary ring", via the interposition of two bearings 43 locked axially onto fixed ring 41 by means of two annular locking members 44 and 45 secured respectively to fixed ring 41 and rotary ring 42 by means of respective numbers of screws 46 and 47.

Fixed ring 41 is provided internally with two superimposed annular inserts coaxial with shaft 27 and shaped internally in the form of a spherical crown; the bottom one 48 of which is force-fitted inside fixed ring 41, whereas the top one 49 is secured to fixed ring 41 by means of screws 46. The spherical inner surfaces of the said two inserts 48 and 49 define spherical seat 39.

From the bottom of fixed ring 41, there project radially outwards forks 50 (only one of which is shown), the said forks 50 being equal in number to blades 9 and each being connected, by means of a respective ball joint 51, to the top end of a respective pitch change control rod 52 extending downwards inside an annular gap 53 between the inner surface of shaft 2 and the outer surface of shaft 27.

From the outer surface of rotary ring 42, there project radially outwards arms 54 (only one of which is shown), the said arms 54 curving downwards and being equal in number to blades 9. Together with rotary ring 42, each arm 54 defines a respective radial fork 55 open at the bottom and fitted through with a respective pin 56 arranged radially in relation to shaft 27 and aligned with a respective hole 57 formed in side wall 22 of bell 21 and closed off by a respective removable cover 58. The opposite ends of each pin 56 are engaged in rotary manner inside respective radial through holes 59 and 60 coaxial with respective hole 57 and formed, one, in rotary ring 42 and, the other, in respective arm 54. A spherical centre portion of each pin 56 constitutes the inner member of a respective ball joint 61 connecting pin 56 to the free end of a first arm 62 on a respective rocker arm 63, the centre portion of which is hinged in known manner (not shown) inside a respective hole 64 formed through side wall 22 of bell 21, and the second arm 65 of which extends outwards of bell 21 over hub 8.

As shown in FIG. 1, the free end of each arm 65 consists of a fork 66 to which is connected, via a ball joint 67, the top end of a respective connecting rod 68 adjustable in length and the bottom end of which is connected, via a ball joint 69, to a fork 70 on the free end of a respective pitch change lever 20.

The manner in which rods 52, oscillating plate assembly 40, rocker arms 63, connecting rods 68 and levers 20 enable the cyclic and collective pitch of blades 9 to be changed as required is already known and, therefore, requires no further explanation herein.

Some mention should be made, on the other hand, of the advantages afforded by the special structure of shaft 2 and bell 21 as compared with corresponding known structures.

Firstly, on rotor 1 as described herein, hub 8 is integral with shaft 2. Consequently, no through pins need be driven for connecting the hub to the main shaft, and removal of the cover on oscillating plate assembly 40 is made considerably easier.

Secondly, the fact that shaft 2 consists of two portions 3 and 4, connected together in removable manner, simplifies the formation of top portion 4 and integral hub 8, while at the same time enabling rotor 1 to be removed and/or bent for stowage, by simply removing bolts 7.

Finally, the special design and location of forks 55 and respective pins 56, and the formation of respective holes 57 through bell 21 provide for assembling, removing and/or inspecting pins 56 inside respective holes 59 and 60 through holes 57, with no need for removing bell 21.

I claim:

1. A main helicopter rotor comprising a rotary tubular drive shaft; a hub connected to the top end of said tubular shaft; a number of blades extending radially outward from said hub and each having a pitch change lever; a fixed shaft coaxial with said rotary shaft and extending at least partially inside the same; an oscillating plate assembly supported on said fixed shaft; a number of pitch change control rods connected to said oscillating plate assembly; a top bell, connected to the said hub, for protecting said oscillating plate assembly; and rocker arms extending through said bell and each connecting a respective said pitch change lever to said oscillating plate assembly; characterised by the fact that the said hub is integral with the said tubular shaft; the said bell being connected solely to the said hub via removable connecting means, allowing removal of said rocker arms followed by the removal of said bell thereby allowing inspection of said oscillating plate assembly, and each said rocker arm being connected to said oscillating plate assembly via articulated connecting means comprising a pin extending radially in relation to the said bell; said bell presenting lateral access holes, each aligned with a respective said pin.

2. A rotor as claimed in claim 1, characterised by the fact that the said removable connecting means consist of bolts, each of which engages, in freely sliding manner, a respective through hole formed through the said hub.

3. A rotor as claimed in claim 1, characterised by the fact that the said rotary tubular shaft is arranged substantially vertically, and compreses an upper and a lower portion coaxial with each other and connected together in removable manner; the said upper portion and the said hub constituting a single integral piece.

4. A rotor as claimed in claim 1, characterised by the fact that the said oscillating plate assembly comprises a fixed inner ring and an outer ring designed to turn with the said tubular shaft; a number of curved arms, equal in number to the said blades, projecting radially outwards from the said outer ring; each said curved arm defining, together with the said outer ring, a fork fitted through with a respective said pin and lying in a radial plane in relation to the said bell.

5. A rotor as claimed in claim 4, characterised by the fact that each said curved arm presents a first through hole; the said outer ring having a second through hole next to each said curved arm; and the said first and secong through holes being aligned with each other and with a respective said lateral access hole on the said bell, and being engaged by the opposite ends of a respective said pin.

* * * * *